US012726724B2

(12) United States Patent
Jang et al.

(10) Patent No.: US 12,726,724 B2
(45) Date of Patent: Sep. 1, 2026

(54) IMAGE PROCESSING SYSTEM

(71) Applicant: SAMSUNG ELECTRONICS CO., LTD., Suwon-si (KR)

(72) Inventors: Chan Young Jang, Suwon-si (KR); Seong Yeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 18/886,374

(22) Filed: Sep. 16, 2024

(65) Prior Publication Data

US 2025/0267374 A1 Aug. 21, 2025

(30) Foreign Application Priority Data

Feb. 16, 2024 (KR) ........................ 10-2024-0022233

(51) Int. Cl.

*H04N 23/84* (2023.01)
*H04N 23/80* (2023.01)
*H04N 25/46* (2023.01)
*H04N 25/77* (2023.01)

(52) U.S. Cl.

CPC ......... *H04N 23/843* (2023.01); *H04N 23/815* (2023.01); *H04N 25/46* (2023.01); *H04N 25/77* (2023.01)

(58) Field of Classification Search

CPC .... H04N 23/843; H04N 23/815; H04N 25/46; H04N 25/77; H04N 25/11; H04N 25/772; H04N 5/335; H04N 5/232; G06T 3/40

See application file for complete search history.

(56) References Cited

U.S. PATENT DOCUMENTS 7,154,075 B2 12/2006 Krymski
8,306,362 B2 11/2012 Compton
9,584,742 B2 2/2017 Park et al.
9,686,485 B2 6/2017 Agranov et al.
11,178,372 B1 11/2021 Jang et al.
11,588,988 B2 2/2023 Jang et al.
2007/0063128 A1* 3/2007 Krymski ................ H04N 25/78 348/E3.02
2010/0231765 A1 9/2010 Kefeder
2012/0194720 A1* 8/2012 Bowers ................ H04N 25/447 348/E5.091
2015/0350575 A1* 12/2015 Agranov ............. H04N 25/134 348/302
2023/0388662 A1* 11/2023 Feld ....................... H04N 25/46

* cited by examiner

*Primary Examiner* — Twyler L Haskins
*Assistant Examiner* — Surafel Yilmakassaye
(74) *Attorney, Agent, or Firm* — Sughrue Mion, PLLC

(57) ABSTRACT

An image processing system includes an image sensor including a pixel array and a digital signal processor. Pixel signals, are spaced apart from an adjacent signal in a first or second direction by a first interval. The pixel array includes a first pixel in a (k)th row and a (j)th column, a second pixel in a (k+2)th row and the (j)th column, a third pixel in the (k+2)th row and a (j+2)th column, and a fourth pixel in a (k+4)th row and the (j+2)th column, The image sensor outputs first to fourth binning signals respectively by performing binning based on a first to a fourth pixel signals output from the first to fourth pixels. The digital signal processor interpolates an image signal in accordance with a mode and outputs interpolation signals, which are spaced apart from an adjacent signal in the first or second direction by a second interval.

20 Claims, 14 Drawing Sheets

210

PX

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

PS

IMG1

INV_1

INV_1

START receive pixel signal of (k)th row and (j)th column ~S201 receive pixel signal of (k+2)th row and (j)th column ~S202 output first binning signal ~S203 receive pixel signal of (k+2)th row and (j+2)th column ~S204 receive pixel signal of (k+4)th row and (j+2)th column ~S205 output second binning signal ~S206 receive pixel signal of (k+1)th row and (j+1)th column ~S207 receive pixel signal of (k+3)th row and (j+1)th column ~S208 output third binning signal ~S209 receive pixel signal of (k+3)th row and (j+3)th column ~S210 receive pixel signal of (k+5)th row and (j+3)th column ~S211 output fourth binning signal ~S212

Figure 7:
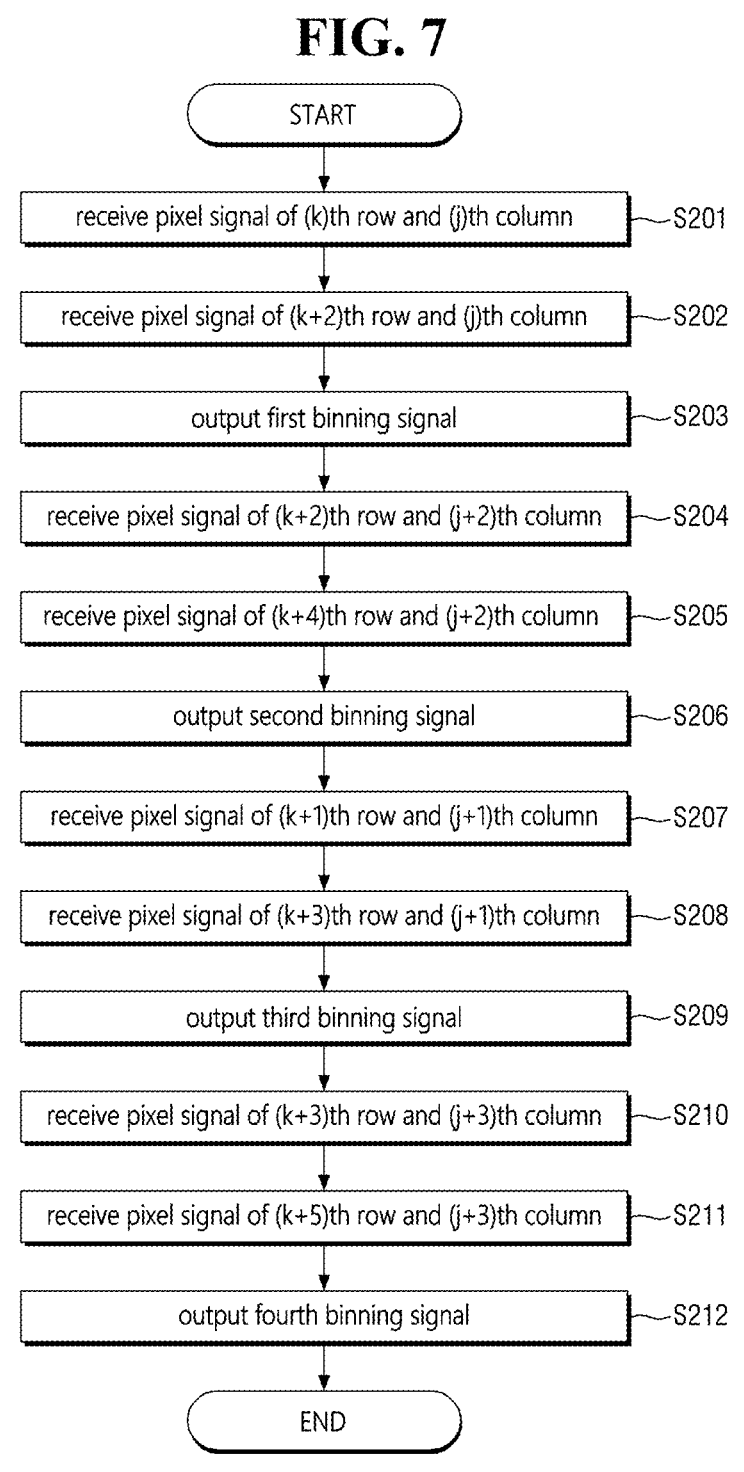

END

300
310
Processor
Memory
320
IMG2
200
Camera Sensor

IMAGE PROCESSING SYSTEM

CROSS-REFERENCE TO RELATED APPLICATION

This application claims priority from Korean Patent Application No. 10-2024-0022233 filed on Feb. 16, 2024 in the Korean Intellectual Property Office and all the benefits accruing therefrom under 35 U.S.C. 119, the contents of which in its entirety are herein incorporated by reference.

BACKGROUND

1. Technical Field

One or more example embodiments of the disclosure relate to an image processing system.

2. Description of the Related Art

With the development of technology, a number of pixels in an image sensor, that is, resolution, is increasing, and the increasing pixel resolution may increase an amount of data to be processed. Accordingly, the image sensor may need to perform binning. The binning operation may include an operation of collecting information on adjacent pixels to form one kind of information and generating an image signal to be processed by using the collected information, instead of making an image by using information of all pixels of an image sensing device.

Meanwhile, in case of analog binning, a jagging artifact may occur due to uneven binning sampling signals.

BRIEF SUMMARY

One or more example embodiments provide an image processing system that may output an image with improved quality by alleviating a jagging artifact.

According to an aspect of an example embodiment of the disclosure, there is provided an image processing system including: an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and from a signal adjacent thereto in the second direction by the first interval; and a digital signal processor configured to perform image processing on an image signal received from the image sensor, wherein the pixel array further includes a first pixel disposed in a (k)th (k being a natural number) row and a (j)th (j being a natural number) column, a second pixel disposed in a (k+2)th row and the (j)th column, a third pixel disposed in the (k+2)th row and a (j+2)th column, and a fourth pixel disposed in a (k+4)th row and the (j+2)th column, and the first to the fourth pixels are configured to respectively output a first pixel signal, a second pixel signal, a third pixel signal, and a fourth pixel signal. The image sensor is configured to output a first binning signal by performing binning based on the first pixel signal and the second pixel signal, output a second binning signal by performing binning based on the third pixel signal and the fourth pixel signal, and output a second image signal based on the first binning signal and the second binning signal. The digital signal processor is configured to output a third image signal including a plurality of interpolation signals by interpolating the second image signal in accordance with an operation mode, wherein each of the plurality of interpolation signals are spaced apart from an interpolation signal adjacent thereto in the first direction by a second interval and spaced apart from an interpolation signal adjacent thereto in the second direction by the second interval.

According to other aspect of an example embodiment of the disclosure, there is provided an image processing system including: an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and spaced apart from a signal adjacent thereto in the second direction by the first interval, wherein the pixel array includes: a first pixel, a second pixel, a third pixel, and a fourth pixel arranged along the second direction; a fifth pixel, a sixth pixel, a seventh pixel, and an eighth pixel, arranged in the first direction from the first to the fourth pixels and arranged along the second direction; a ninth pixel, a tenth pixel, an eleventh pixel, and a twelfth pixel arranged in the first direction from the fifth to the eighth pixels and arranged along the second direction; a thirteenth pixel, a fourteenth pixel, a fifteenth pixel, and a sixteenth pixel arranged in the first direction from the ninth to the twelfth pixels and arranged along the second direction; a seventeenth pixel, an eighteenth pixel, a nineteenth pixel, and a twentieth pixel arranged in the first direction from the thirteenth to the sixteenth pixels and arranged along the second direction; and a twenty-first pixel, a twenty-second pixel, a twenty-third pixel, and a twenty-fourth pixel arranged in the first direction from the seventeenth pixel to the twentieth pixels and arranged along the second direction. The image sensor further includes: a first analog-to-digital converter connected to the first, the fifth, the ninth, the thirteenth, the seventeenth, and the twenty-first pixels; a second analog-to-digital converter connected to the second, the sixth, the tenth, the fourteenth, the eighteenth, and the twenty-second pixels; a third analog-to-digital converter connected to the third, the seventh, the eleventh, the fifteenth, the nineteenth, and the twenty-third pixels; and a fourth analog-to-digital converter connected to the fourth, the eighth, the twelfth, the sixteenth, the twentieth, and the twenty-fourth pixels. The first to the twenty-fourth pixels respectively output a first pixel signal to a twenty-fourth pixel signal. The first analog-to-digital converter is configured to output a first binning signal by performing binning based on the first pixel signal and a ninth pixel signal, and output a second binning signal by performing binning based on a fifth pixel signal and a thirteenth pixel signal. The second analog-to-digital converter is configured to output a third binning signal by performing binning based on a second pixel signal and a tenth pixel signal, and output a third binning signal by performing binning based on a sixth pixel signal and a fourteenth pixel signal. The third analog-to-digital converter is configured to output a fifth binning signal by performing binning based on an eleventh pixel signal and a nineteenth pixel signal, and output a sixth binning signal by performing binning based on a fifteenth pixel signal and a twenty-third pixel signal. The fourth analog-to-digital converter is configured to output a seventh binning signal by performing binning based on a twelfth pixel signal and a twentieth pixel signal, and output an eighth binning signal by performing binning based on a sixteenth pixel signal and a twenty-fourth pixel signal.

According to other aspect of an example embodiment of the disclosure, there is provided an image processing system including: an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and spaced apart from a signal adjacent thereto in the second direction by the first interval; and a host configured to perform image processing on an image signal received from the image sensor, wherein the pixel array further includes: a first pixel disposed in a (k)th (k being a natural number) row and a (j)th (j being a natural number) column; a second pixel disposed in a (k+2)th row and the (j)th column; a third pixel disposed in the (k+2)th row and a (j+2)th column; and a fourth pixel disposed in a (k+4)th row and the (j+2)th column, wherein the first to the fourth pixels respectively output a first pixel signal, a second pixel signal, a third pixel signal, and a fourth pixel signal, wherein the image sensor is configured to output a first binning signal by performing binning based on the first pixel signal and the second pixel signal, output a second binning signal by performing binning based on the third pixel signal and the fourth pixel signal, and output a second image signal based on the first binning signal and the second binning signal. The host includes: a memory configured to at least one instruction; and a processor configured to perform the at least one instruction stored in the memory, wherein the at least one instruction, when executed, causes the processor to output a third image signal including a plurality of interpolation signals by interpolating the second image signal in accordance with a selected mode, each of the plurality of interpolation signals being spaced apart from a signal adjacent thereto in the first direction by a second interval and spaced apart from a signal adjacent thereto in the second direction by the second interval.

The objects of the disclosure are not limited to those mentioned above and additional objects of the disclosure, which are not mentioned herein, will be clearly understood by those skilled in the art from the following description of the disclosure.

BRIEF DESCRIPTION OF THE DRAWINGS

The above and other aspects, features, and advantages of the disclosure will be more clearly understood from the following detailed description, taken in conjunction with the accompanying drawings.

FIG. 7 is an example flow chart illustrating a binning method performed by an image processing system according to some example embodiments.

FIG. 9 is an example view illustrating a binning method performed by an image processing system according to some example embodiments.

FIG. 14 is an example block diagram illustrating an image processing process of an image processing system according to some example embodiments.

DETAILED DESCRIPTION

Hereinafter, example embodiments of the disclosure will be described in detail with reference to the accompanying drawings.

Figure 1:
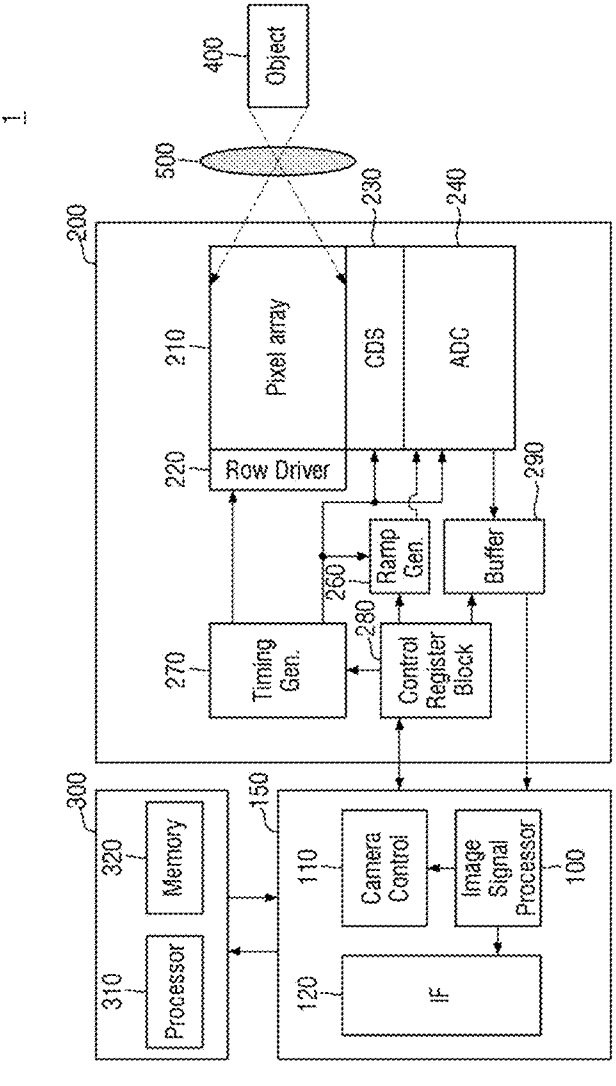
FIG. 1 is an example block diagram illustrating an image processing system according to some example embodiments.

FIG. 1 is an example block diagram illustrating an image processing system according to some example embodiments.

Referring to FIG. 1, an image processing system 1 may include an image sensor 200, a digital signal processor (DSP) 150 and a host 300.

The image sensor 200 may include a pixel array 210, a row driver 220, a correlated double sampling (CDS) block 230, an analog-to-digital digital converter (ADC) 240, a ramp signal generator 260, a timing generator 270, a control register block 280 and a buffer 290. The image sensor 200 may sense an object 400 captured through a lens 500 under a control of the digital signal processor 150, and the digital signal processor 150 may process an image output by the image sensor 200 and output the processed image to the host 300.

The control register block 280 may control an overall operation of the image sensor 200. For example, the control register block 280 may directly transmit an operation signal to the timing generator 270, the ramp signal generator 260 and the buffer 290.

The timing generator 270 may generate a signal that is used as a reference of operation timings of various components of the image sensor 200. An operation timing reference signal generated by the timing generator 270 may be transferred to the row driver 220, the correlated double sampling block 230, the analog-to-digital converter 240, the ramp signal generator 260 and the like.

The ramp signal generator 260 may generate and transmit ramp signals used in the correlated double sampling block 230 and the analog-to-digital converter 240.

The buffer 290 may temporarily store an image signal. For example, the buffer 290 may temporarily store an image signal for which analog binning is performed before transmitting the image signal to the digital signal processor 150.

The pixel array 210 may include a plurality of photo-sensing elements, for example, a photo diode or a pinned photo diode.

The row driver 220 may selectively activate a row of the pixel array 210.

The correlated double sampling block 230 and the analog-to-digital converter 240 may sample a pixel signal provided from pixel array 210, compare the pixel signal with a ramp signal and then convert an analog image signal into a digital image signal based on a comparison result. In some embodiments, the analog-to-digital converter 240 may generate a binning signal by performing binning based on the received pixel signals.

The host 300 may include any device capable of outputting or displaying an image. For example, the host 300 may refer to a computer, a mobile communication device or other image output terminals. The host 300 may include a processor 310 and a memory 320.

The processor 310 may control an overall operation of the image processing system 1 and more particularly, an operation of other components constituting the image processing system 1. The processor 310 may include a general-purpose processor, a dedicated processor or an application processor.

The memory 320 may be used as a main memory device of the image processing system 1, and may include a volatile memory such as a SRAM and/or a DRAM or may include a nonvolatile memory such as a flash memory, a PRAM and/or an RRAM. The memory 320 may store an instruction for causing the processor 310 to control overall operations of the digital signal processor 150 and the image sensor 200, which constitute the image processing system 1. The processor 310 may perform a series of operations for controlling the digital signal processor 150 and the image sensor 200, which constitute the image processing system 1, by executing the instruction stored in the memory 320.

The digital signal processor 150 may include a camera control 110, an image signal processor (ISP) 100 and an interface (I/F) 120. The digital signal processor 150 is shown as being positioned outside the image sensor 200, but is not limited thereto, and the digital signal processor 150 may be positioned inside the image sensor 200.

The camera control 110 may control an operation of the control register block 280. The camera control 110 may control an operation of the image sensor 200, e.g., an operation of the control register block 280, by using an inter-integrated circuit (I2C), but embodiments of the disclosure are not limited thereto.

The image signal processor 100 may receive an image signal output from the buffer 290, process and/or treat the received image signal such that a user may see an image according to the image signal, and output the processed or treated image signal to the host 300 through the interface 120.

According to some embodiments, the image signal processor 100 may perform interpolation for the image signal output from the image sensor 200. The image signal processor 100 may output the interpolated image signal to the host 300. In this case, the image output from the image sensor 200 may be a raw image signal from the pixel array 210 or an image signal for which analog binning has been performed.

Although the image signal processor 100 is shown as being positioned inside the digital signal processor 150, the image signal processor 100 may be positioned inside the image sensor 200. Also, the image sensor 200 and the image signal processor 100 may be implemented as one package, for example, a multi-chip package (MCP).

According to some embodiments, the operation performed by the digital signal processor 150 may be also performed in the host 300. The instruction for processing and/or treating the received image signal such that a user may see an image according to the image signal may be stored in the memory 320 of the host 300. The processor 310 of the host 300 may receive the image signal from the image sensor 200 and/or the digital signal processor 150 by executing the instruction stored in the memory 320, may process or treat the received image signal such that the user may see an image according to the image signal, may generate the processed or treated image signal, and may store the generated image signal in the memory 320.

Hereinafter, a pixel signal may refer to information or values output or acquired from an optical signal through pixel elements having a corresponding color filter in accordance with a Bayer pattern included in the pixel array. Hereinafter, a binning signal may refer to information or values output or acquired by binning based on two or more pixel signals. Hereinafter, an interpolation signal may refer to information or values output or acquired by performing interpolation based on the pixel signal and/or the binning signal. Hereinafter, the raw image signal may be a unit raw image for which image signal processing is to be performed and may refer to an image signal configured through combination of pixel signals sensed by each pixel in the image sensor 200. Hereinafter, a binning image signal may refer to an image signal configured through combination of binning signals that have been binned based on pixel signals constituting the raw image signal. Hereinafter, an interpolation image signal may refer to an image signal configured through combination of a plurality of interpolation signals acquired by performing interpolation based on pixel signals constituting a raw image signal or performing interpolation based on binning signals constituting a binning image signal.

Figure 2:
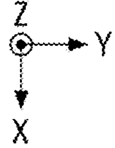
FIG. 2 is an example view illustrating a pixel array.

FIG. 2 is an example view illustrating a pixel array.

Referring to FIG. 2, the pixel array 210 may include a plurality of pixels PX capable of sensing an optical signal of the object 400. The plurality of pixels may be repeatedly disposed to a first direction X (or row direction) and a second direction Y (or column direction) in a matrix form on the pixel array 210. The plurality of pixels may include a corresponding color filter in accordance with the Bayer pattern. Prior to description, a pixel including a green color filter is referred to as a green pixel, a pixel including a blue color filter is referred to as a blue pixel, and a pixel including a red color filter is referred to as a red pixel. In the pixel array 210, a green pixel and a blue pixel may be sequentially and repeatedly disposed to the first direction X or the row direction in accordance with the Bayer pattern, and a red pixel and a green pixel may be adjacent to each other in the second direction Y or the column direction and thus may be sequentially and repeatedly disposed to the first direction X or the row direction. However, the Bayer pattern is not limited to the above arrangement of color pixels, and a person skilled in the art would understand that the disclosure applies to any modified embodiments, for example, in which color pixels have a Bayer pattern disposed in a different order.

Figure 3:
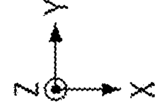
FIG. 3 is an example view illustrating an image sensing process of an image sensor.

FIG. 3 is an example view illustrating an image sensing process of an image sensor.

Referring to FIG. 3, each pixel PX included in the pixel array 210 may include a color filter corresponding to the Bayer pattern. Each pixel PX may output a pixel signal PS by sensing the optical signal of the object 400. A raw image signal IMG1 may be generated by combining a plurality of pixel signals PS. Each of pixels associated with the pixel signals PS may be arranged to be spaced apart from a pixel adjacent thereto in a row direction on the raw image signal IMG1 as much as a first interval INV_1. Also, each of the pixels associated with the pixel signals PS may be arranged to be spaced apart from a pixel adjacent thereto in a column direction on the raw image signal IMG1 as much as the first interval INV_1. In this case, the first interval INV_1 may mean a distance from a center point of a pixel corresponding to one pixel signal to a center point of a pixel corresponding to an adjacent pixel signal.

Figure 4:
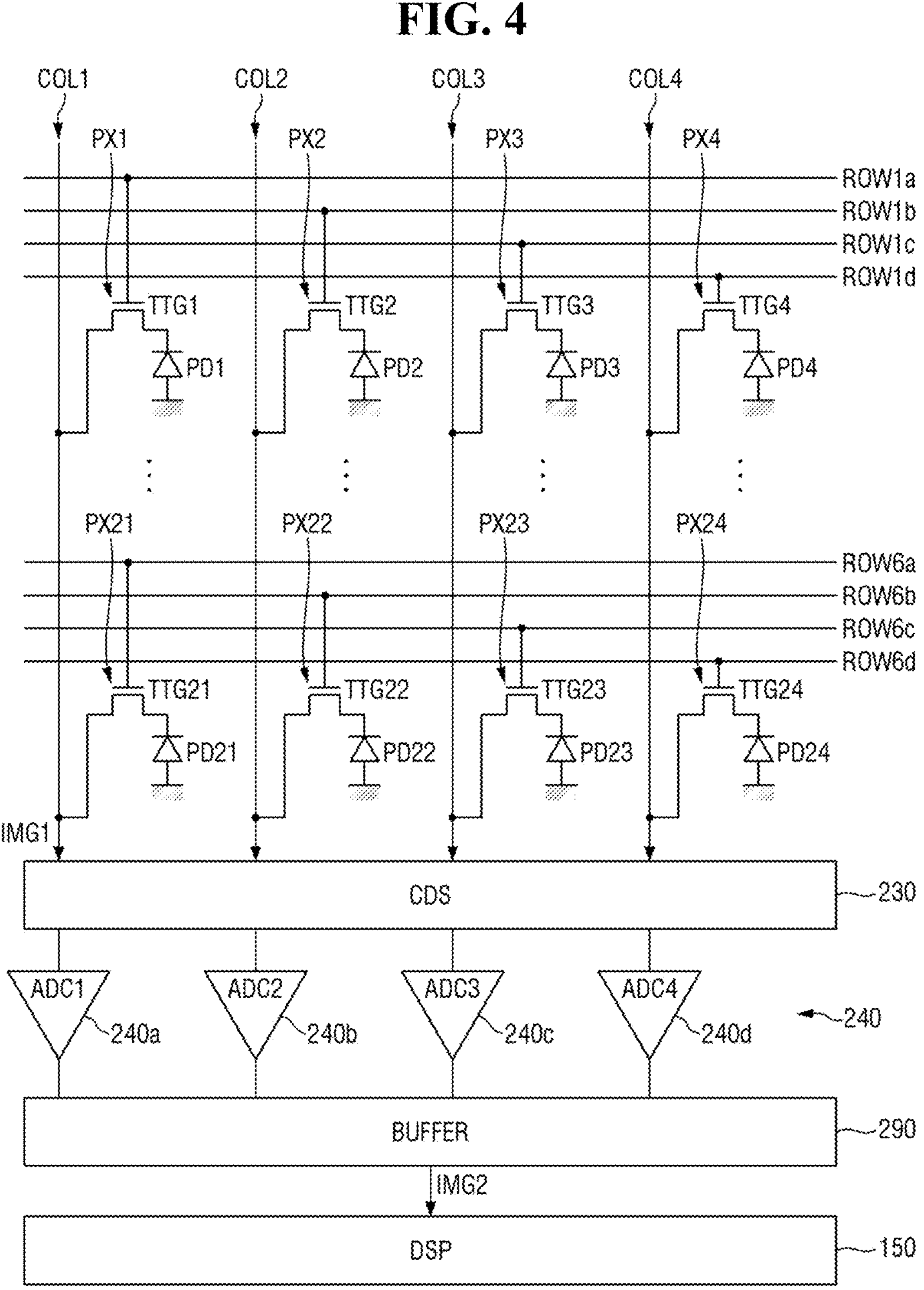
FIG. 4 is an example circuit diagram illustrating an image sensor according to some example embodiments.

FIG. 4 is an example circuit diagram illustrating an image sensor according to some embodiments.

Referring to FIG. 4, first to twenty-fourth pixels PX1 to PX24 may be repeatedly arranged. The first to twenty-fourth pixels PX1 to PX24 may respectively receive the optical signal and output first to twenty-fourth pixel signals under the control of the timing generator 270. The first direction X may mean a row direction, and a second direction Y crossing the first direction may mean a column direction. The first to fourth pixels PX1 to PX4 may be arranged along the second direction Y, and the fifth to eighth pixels PX5 to PX8 may be disposed in the first direction X from the first to fourth pixels PX1 to PX4 and may be arranged along the second direction Y. The ninth to twelfth pixels PX9 to PX12 may be disposed in the first direction X from the fifth to eighth pixels PX5 to PX8 and may be arranged along the second direction Y. The thirteenth to sixteenth pixels PX13 to PX16 may be disposed in the first direction X from the ninth to twelfth pixels PX9 to PX12, and may be arranged along the second direction Y. The seventeenth to twentieth pixels PX17 to PX20 may be disposed in the first direction X from the thirteenth to sixteenth pixels PX13 to PX16, and may be arranged along the second direction Y. The twenty-first to twenty-fourth pixels PX21 to PX24 may be disposed in the first direction X from the seventeenth to twentieth pixels PX17 to PX20, and may be arranged along the second direction Y.

A plurality of row lines ROW1*a* to ROW1*d*, ROW2*a* to ROW2*d*, ROW3*a* to ROW3*d*, ROW4*a* to ROW4*d*, ROW5*a* to ROW5*d* and ROW6*a* to ROW6*d* may be disposed to extend along the second direction Y, and a plurality of column lines COL1 to COL4 may be disposed to extend along the first direction X. The plurality of row lines ROW1*a* to ROW1*d*, ROW2*a* to ROW2*d*, ROW3*a* to ROW3*d*, ROW4*a* to ROW4*d*, ROW5*a* to ROW5*d* and ROW6*a* to ROW6*d* and the plurality of column lines COL1 to COL4 may be connected to all of the first to 24th pixels PX1 to PX24 while crossing each other.

The first pixel PX1 may include a first transfer transistor TTG1 connected to a first photodiode PD1, a first row line ROW1*a* and a first column line COL1. The second pixel PX2 may include a second transfer transistor TTG2 connected to a second photodiode PD2, a second row line ROW1*b* and a second column line COL2. The third pixel PX3 may include a third transfer transistor TTG3 connected to a third photodiode PD3, a third row line ROW1*c* and a third column line COL3. The fourth pixel PX4 may include a fourth transfer transistor TTG4 connected to a fourth photodiode PD4, a fourth row line ROW1*d* and a fourth column line COL4.

Descriptions of the fifth to 20th pixels are redundant and thus will be omitted.

The 21st pixel PX21 may include a 21st transfer transistor TTG21 connected to a 21st photodiode PD21, a 21st row line ROW6*a* and the first column line COL1. The 22nd pixel PX22 may include a 22nd transfer transistor TTG22 connected to a 22nd photodiode PD22, a 22nd row line ROW6*b* and the second column line COL2. The 23rd pixel PX23 may include a 23rd transfer transistor TTG23 connected to a 23rd photodiode PD23, a 23rd row line ROW6*c* and the third column line COL3. The 24th pixel PX24 may include a 24th transfer transistor TTG24 connected to a 24th photodiode PD24, a 24th row line ROW6*d* and the fourth column line COL4.

According to some embodiments, the first, third, sixth, eighth, ninth, 11th, 14th, 16th, 17th, 19th, 22nd and 24th pixels PX1, PX3, PX6, PX8, PX9, PX11, PX14, PX16, PX17, PX19, PX22 and PX24 may include a green color filter in accordance with the Bayer pattern. The second, fourth, tenth, 12th, 18th and 20th pixels PX2, PX4, PX10, PX12, PX18 and PX20 may include a red color filter in accordance with the Bayer pattern. The fifth, seventh, 13th, 15th, 21st and 23rd pixels PX5, PX7, PX13, PX15, PX21 and PX23 may include a blue color filter in accordance with the Bayer pattern. However, the disclosure is not limited to the above examples, and the pixels may include filters of different colors depending on the type of the Bayer pattern.

The correlated double sampling block 230 may be connected to the first to fourth column lines COL1 to COL4, and may receive a raw image signal through the first to fourth column lines COL1 to COL4.

The analog-to-digital converter 240 may include a first analog-to-digital converter 240*a*, a second analog-to-digital converter 240*b*, a third analog-to-digital converter 240*c* and a fourth analog-to-digital converter 240*d*.

The first, fifth, ninth, 13th, 17th and 21st pixels PX1, PX5, PX9, PX13, PX17 and PX21 may be connected to the first column line COL1, and may be connected to the first analog-to-digital converter 240*a* through the correlated double sampling block 230. The first, fifth, ninth, 13th, 17th and 21st pixels PX1, PX5, PX9, PX13, PX17 and PX21 may provide the first, fifth, ninth, 13th, 17th and 21st pixel signals to the first analog-to-digital converter 240*a*.

The second, sixth, tenth, 14th, 18th and 22nd pixels PX2, PX6, PX10, PX14, PX18 and PX22 may be connected to the second column line COL2, and may be connected to the second analog-to-digital converter 240*b* through the correlated double sampling block 230. The second, sixth, tenth, 14th, 18th and 22nd pixels PX2, PX6, PX10, PX14, PX18 and PX22 may provide the second, sixth, tenth, 14th, 18th and 22nd pixel signals to the second analog-to-digital converter 240*b*.

The third, seventh, 11th, 15th, 19th and 23rd pixels PX3, PX7, PX11, PX15, PX19 and PX23 may be connected to the third column line COL3, and may be connected to the third analog-to-digital converter 240*c* through the correlated double sampling block 230. The third, seventh, 11th, 15th, 19th and 23rd pixels PX3, PX7, PX11, PX15, PX19 and PX23 may provide the third, seventh, 11th, 15th, 19th and 23rd pixel signals to the third analog-to-digital converters 240*c*.

The fourth, eighth, 12th, 16th, 20th and 24th pixels PX4, PX8, PX12, PX16, PX20 and PX24 may be connected to the fourth column line COL4, and may be connected to the fourth analog-to-digital converter 240*d* through the correlated double sampling block 230. The fourth, eighth, 12th, 16th, 20th and 24th pixels PX4, PX8, PX12, PX16, PX20 and PX24 may provide the fourth, eighth, 12th, 16th, 20th and 24th pixel signals to the fourth analog-to-digital converter 240*d*.

The analog-to-digital converter 240 may generate a binning image signal IMG2 by performing binning for the raw image signal IMG1 including the plurality of pixel signals received through the correlated double sampling block 230. The buffer 290 may buffer the binning image signal IMG2 received from the analog-to-digital converter 240 and output the binning image signal IMG2 to the digital signal processor 150.

Figure 5:
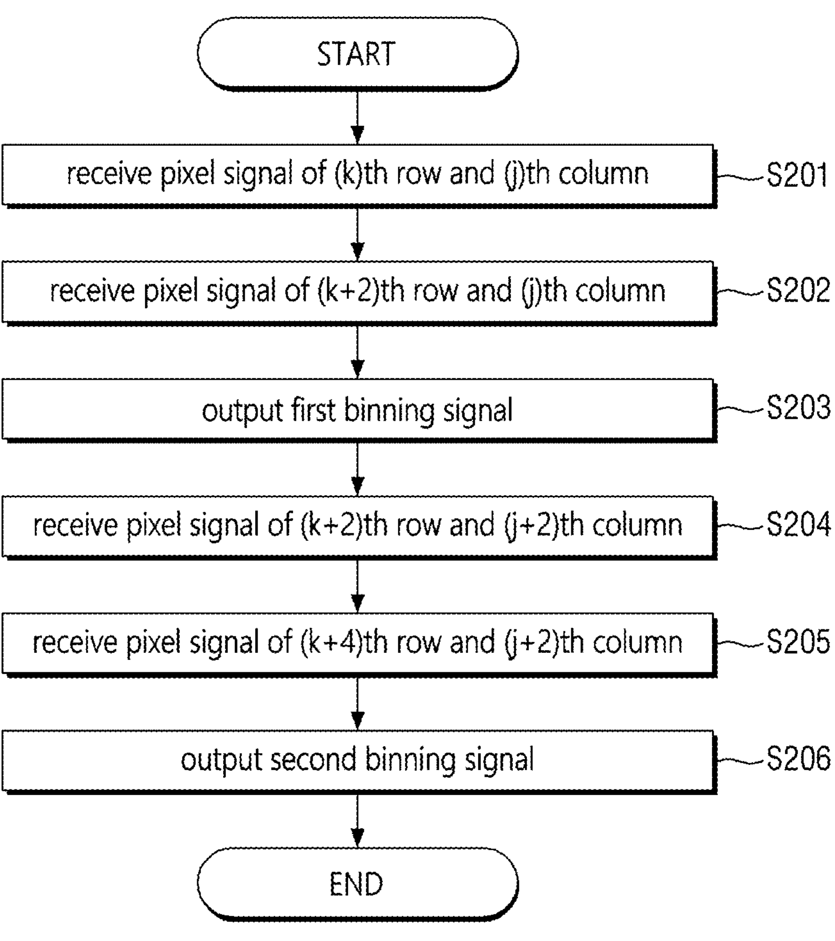
FIG. 5 is an example flow chart illustrating a binning method performed by an image processing system according to some example embodiments.
Figure 6:
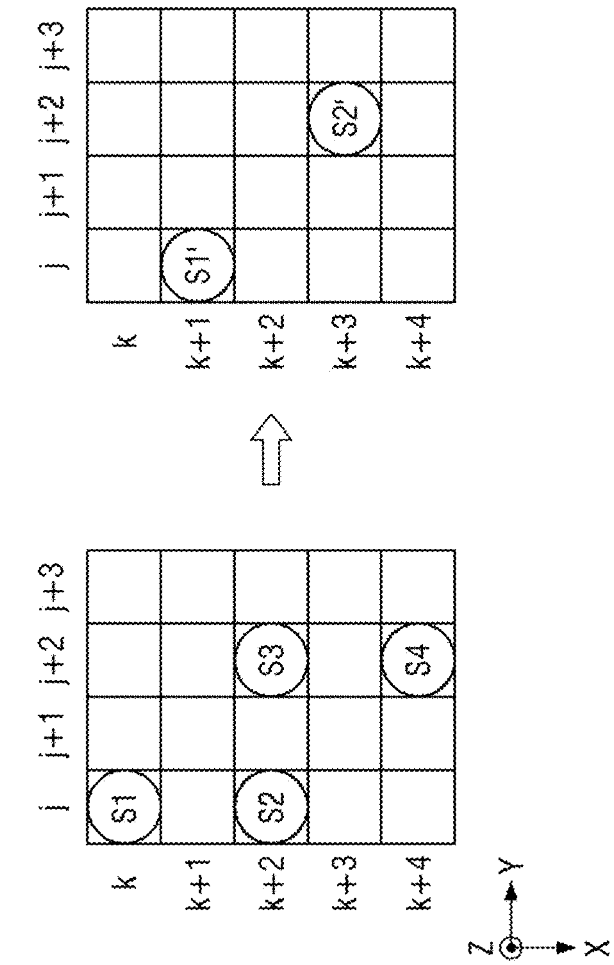
FIG. 6 is an example view illustrating a binning method performed by an image processing system according to some example embodiments.

FIG. 5 is an example flow chart illustrating a binning method performed by an image processing system according to some embodiments. FIG. 6 is an example view illustrating a binning method performed by an image processing system according to some embodiments.

Referring to FIGS. 5 and 6, a pixel signal S1 may be output from a pixel disposed in a (k)th row and a (j)th column (where k and j are natural numbers) of the pixel array 210, and the analog-to-digital converter 240 may receive the pixel signal S1 through the correlated double sampling block 230 (S201). A pixel signal S2 may be output from a pixel disposed in a (k+2)th row and the (j)th column of the pixel array 210, and the analog-to-digital converter 240 may receive the pixel signal S2 through the correlated double sampling block 230 (S202).

For example, when the pixel disposed in the (k)th row and the (j)th column includes a blue filter, the corresponding pixel signal S1 of a blue color may be output, and the pixel disposed in the (k+2)th row and the (j)th column may also include a blue filter in accordance with the Bayer pattern, and thus, the corresponding pixel signal S2 of a blue color may be output. A similar description may be applied to a case in which the pixel disposed in the (k)th row and (j)th column includes a red filter or a green filter, and a detailed description thereof will be omitted.

The analog-to-digital converter 240 may receive the pixel signals S1 and S2 from the pixel disposed in the (k)th row and the (j)th column and the pixel disposed in the (k+2)th row and the (j)th column, respectively, and may output a first binning signal S1' by performing binning based on the received pixel signals S1 and S2 (S203). For example, the first binning signal S1' may be associated with a pixel in a (k+1)th row and the (j)th column between the pixel disposed in the (k)th row and the (j)th column and the pixel disposed in the (k+2)th row and the (j)th column, but is not limited thereto.

According to some embodiments, a pixel signal S3 may be output from the pixel disposed in the (k+2)th row and a (j+2)th column of the pixel array 210, and the analog-to-digital converter 240 may receive the pixel signal S3 through the correlated double sampling block 230 (S204). A pixel signal S4 may be output from a pixel disposed in a (k+4)th row and the (j+2)th column of the pixel array 210, and the analog-to-digital converter 240 may receive the pixel signal S4 through the correlated double sampling block 230 (S205).

For example, when the pixel disposed in the (k+2)th row and the (j+2)th column includes a blue filter, the corresponding pixel signal S3 of a blue color may be output, and the corresponding pixel signal S4 of a blue color may be output from the pixel disposed in the (k+4)th row and the (j+2)th column in accordance with the Bayer pattern. A similar description may be applied to a case in which the pixel disposed in the (k+2)th row and (j+2)th column includes a red filter or a green filter, and a detailed description thereof will be omitted.

The analog-to-digital converter 240 may receive the pixel signals S3 and S4 from the pixel disposed in the (k+2)th row and the (j+2)th column and the pixel disposed in the (k+4)th row and the (j+2)th column, respectively, and may output a second binning signal S2' by performing binning based on the received pixel signals S3 and S4 (S206). For example, the second binning signal S2' may be associated with a pixel in a (k+3)th row and the (j+2)th column between the pixel disposed in the (k+2)th row and the (j+2)th column and the pixel disposed in the (k+4)th row and the (j+2)th column, but is not limited thereto.

Figure 8:
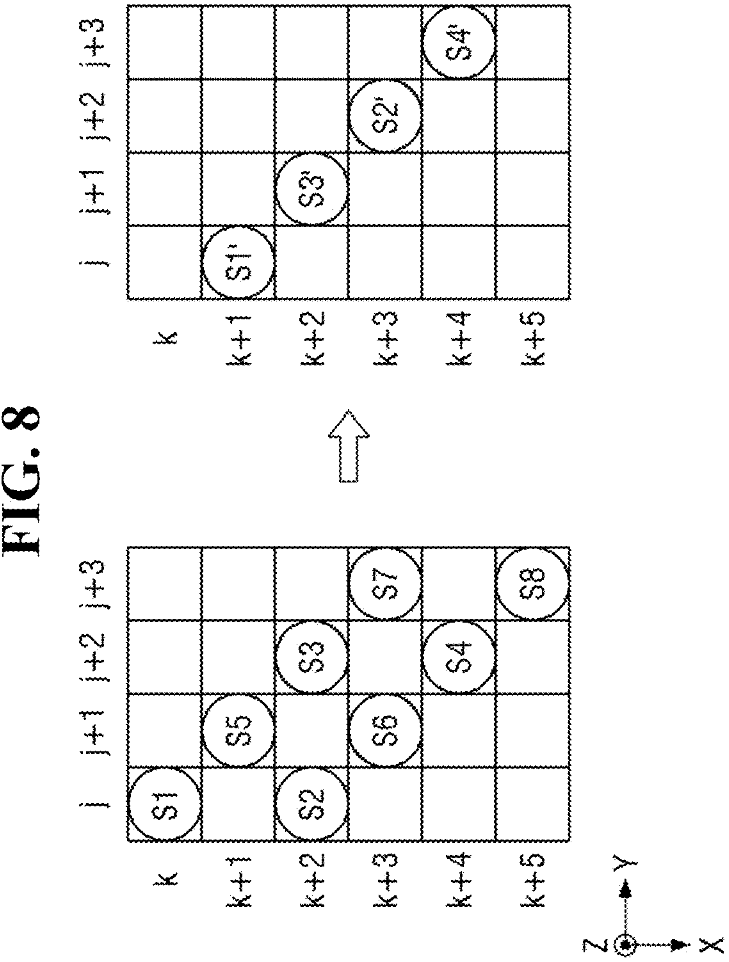
FIG. 8 is an example view illustrating a binning method performed by an image processing system according to some example embodiments.

FIG. 7 is an example flow chart illustrating a binning method performed by an image processing system according to some embodiments. FIG. 8 is an example view illustrating a binning method performed by an image processing system according to some embodiments. Operations S201-S206 in FIG. 7 may be the same or similar to operations S201-S206 in FIG. 5, and therefore, redundant descriptions will be omitted.

Referring to FIGS. 7 and 8, for example, when the pixel disposed in the (k)th row and the (j)th column includes a green filter, the pixel disposed in the (k+1)th row and a (j+1)th column may also include a green filter in accordance with the Bayer pattern. A corresponding pixel signal S5 may be output from the pixel disposed in the (k+1)th row and the (j+1)th column of the pixel array 210, and the analog-to-digital converter 240 may receive the pixel signal S5 through the correlated double sampling block 230 (S207). A corresponding pixel signal S6 may be output from the pixel disposed in the (k+3)th row and the (j+1)th column, and the analog-to-digital converter 240 may receive the pixel signal S6 through the correlated double sampling block 230 (S208).

The analog-to-digital converter 240 may receive the pixel signals S5 and S6 from the pixel disposed in the (k+1)th row and the (j+1)th column and the pixel disposed in the (k+3)th row and the (j+1)th column, respectively, and may output a third binning signal S3' by performing binning based on the received pixel signals S5 and S6 (S209). For example, the third binning signal S3' may be associated with a pixel in the (k+2)th row and the (j+1)th column between the pixel disposed in the (k+1)th row and the (j+1)th column and the pixel disposed in the (k+3)th row and the (j+1)th column, but is not limited thereto.

According to some embodiments, when the pixel disposed in the (k+2)th row and the (j+2)th column includes a green filter, the pixel disposed in the (k+3)th row and a (j+3)th column may also include a green filter in accordance with the Bayer pattern. A corresponding pixel signal S7 may be output from the pixel disposed in the (k+3)th row and the (j+3)th column of the pixel array 210, and the analog-to-digital converter 240 may receive the pixel signal S7 through the correlated double sampling block 230 (S210). A corresponding pixel signal S8 may be output from the pixel disposed in a (k+5)th row and the (j+3)th column, and the analog-to-digital converter 240 may receive the pixel signal S8 through the correlated double sampling block 230 (S211).

The analog-to-digital converter 240 may receive the pixel signals S7 and S8 from the pixel disposed in the (k+3)th row and the (j+3)th column and the pixel disposed in the (k+5)th row and the (j+3)th column, respectively, and may output a fourth binning signal S4' by performing binning based on the received pixel signals S7 and S8 (S212). For example, the fourth binning signal S4' may be associated with a pixel in the (k+4)th row and the (j+4)th column between the pixel disposed in the (k+3)th row and the (j+3)th column and the pixel disposed in the (k+5)th row and the (j+3)th column, but is not limited thereto.

Figure 9:
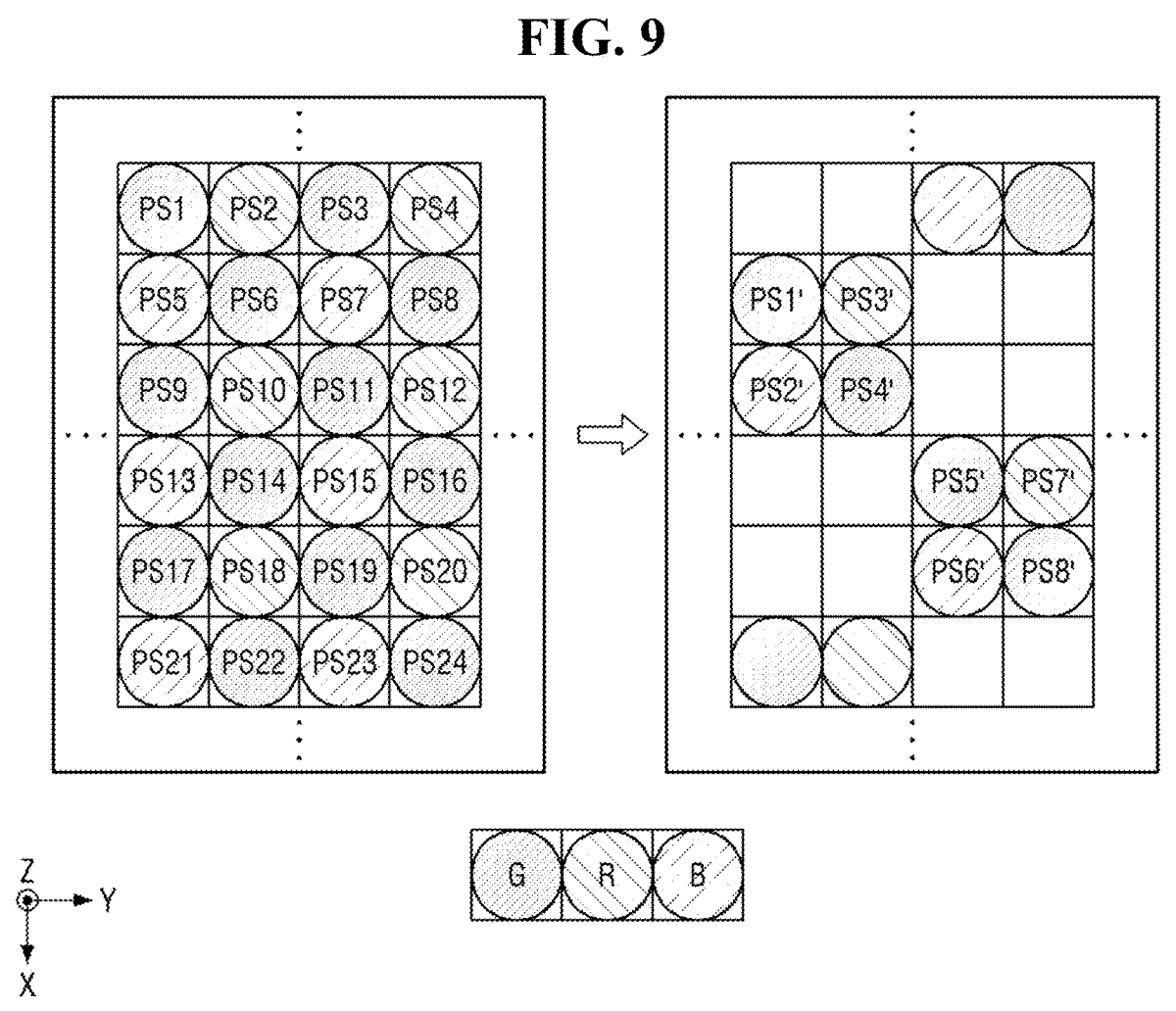

FIG. 9 is an example view illustrating a binning method performed by an image processing system according to some embodiments.

Referring to FIGS. 3 and 9, the first to 24th pixels PX1 to PX24 may receive optical signals in accordance with the Bayer pattern and output first to 24th pixel signals PS1 to PS24 under the control of the timing generator 270. According to some embodiments, the first, third, sixth, eighth, ninth, 11th, 14th, 16th, 17th, 19th, 22nd and 24th pixel signals PS1, PS3, PS6, PS8, PS9, PS11, PS14, PS16, PS17, PS19, PS22 and PS24 may be pixel signals corresponding to a green color in accordance with the Bayer pattern. The second, fourth, tenth, 12th, 18th and 20th pixel signals PS2, PS4, PS10, PS12, PS18 and PS20 may be pixel signals corresponding to a red color. The fifth, seventh, 13th, 15th, 21st and 23rd pixel signals PS5, PS7, PS13, PS15, PS21 and PS23 may be pixel signals corresponding to a blue color. However, the disclosure is not limited to the above example, and the pixel signals may correspond to other colors in accordance with a type of the Bayer pattern.

The first analog-to-digital converter 240*a* may output a first binning signal PS1' by performing a binning operation based on the first and ninth pixel signals PS1 and PS9. The first analog-to-digital converter 240*a* may output a second binning signal PS2' by performing the binning operation based on the fifth and 13th pixel signals PS5 and PS13. The second analog-to-digital converter 240*b* may output a third binning signal PS3' by performing the binning operation based on the second and tenth pixel signals PS2 and PS10. The second analog-to-digital converter 240*b* may output a fourth binning signal PS4' by performing the binning operation based on the sixth and 14th pixel signals PS6 and PS14. The third analog-to-digital converter 240*c* may output a fifth binning signal PS5' by performing the binning operation based on the 11th and 19th pixel signals PS11 and PS19. The third analog-to-digital converter 240*c* may output a sixth binning signal PS6' by performing the binning operation based on the 15th and 23rd pixel signals PS15 and PS23. The fourth analog-to-digital converter 240*d* may output a seventh binning signal PS7' by performing the binning operation based on the 12th and 20th pixel signals PS12 and PS20. The fourth analog-to-digital converter 240*d* may output an eighth binning signal PS8' by performing the binning operation based on the 16th and 24th pixel signals PS16 and PS24.

The binning image signal IMG2 including a plurality of binning signals may be temporarily stored in the buffer 290. The buffer 290 may buffer the binning image signal IMG2 and output the buffered image signal IMG2 to the digital signal processor 150.

Figure 10:
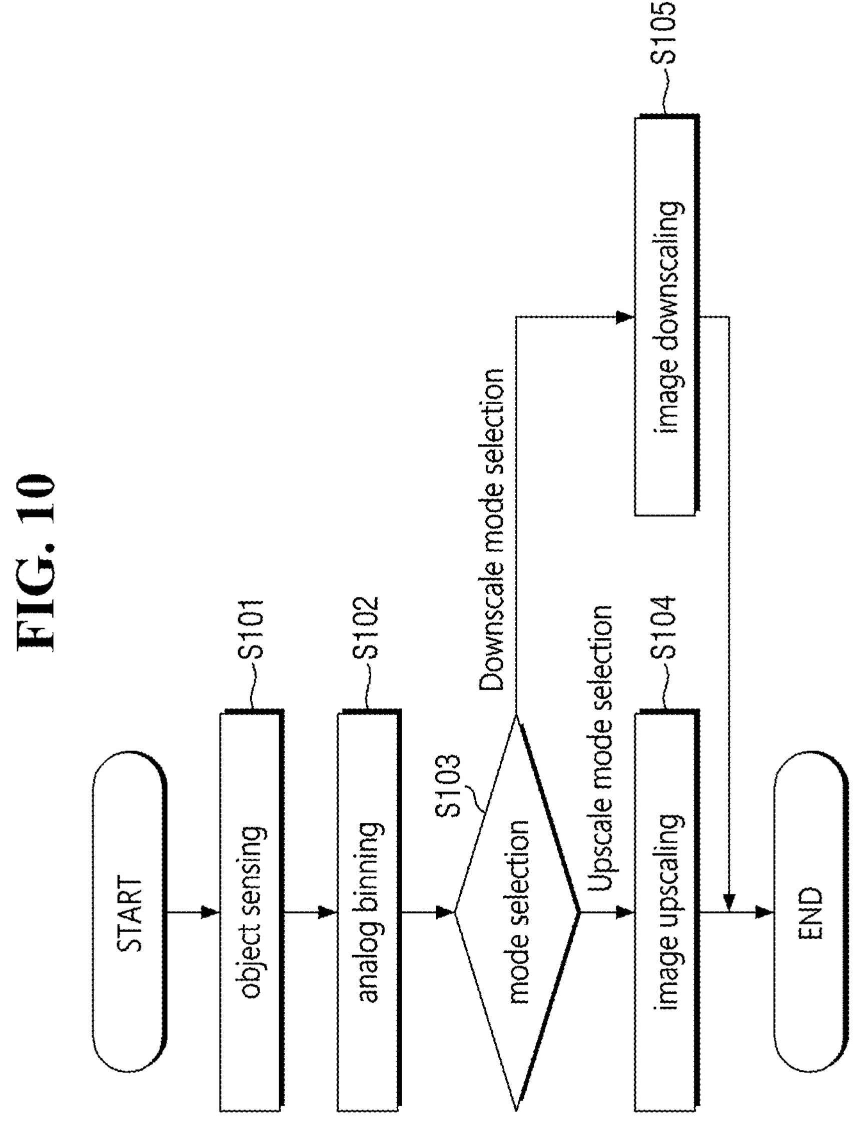
FIG. 10 is an example flow chart illustrating an image processing process of an image processing system according to some example embodiments.

FIG. 10 is an example flow chart illustrating an image processing process of an image processing system according to some embodiments.

Referring to FIGS. 1 and 10, the image sensor 200 may sense the object 400 (S101). The image sensor 200 may obtain a raw image signal by sensing the object 400, and may obtain the binning image signal including the plurality of binning signals by performing binning based on the plurality of pixel signals included in the raw image signal (S102). The image sensor 200 may transmit the binning image signal to the digital signal processor 150.

The digital signal processor 150 may identify an operation mode (S103) and output an up-scaled interpolation image signal or a down-scaled interpolation image signal by interpolating the binning image signal in a manner in accordance with the operation mode. For example, the digital signal processor 150 may output the up-scaled interpolation image signal by receiving an up-scale command and interpolating the binning image signal in accordance with an up-scale mode (S104). Also, the digital signal processor 150 may output the down-scaled interpolation image signal by receiving a down-scale command and interpolating the binning image signal in accordance with a down-scale mode (S105).

Figure 11:
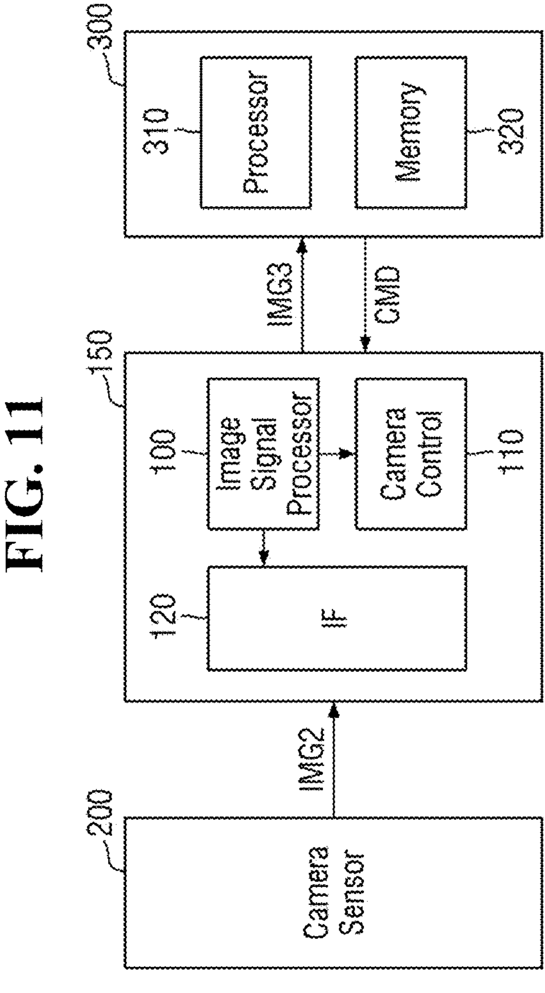
FIG. 11 is an example block diagram illustrating an image processing process of an image processing system according to some example embodiments.

FIG. 11 is an example block diagram illustrating an image processing process of an image processing system according to some embodiments.

Referring to FIG. 11, the image sensor 200 may transmit the binning image signal IMG2 including a plurality of binning signals to the digital signal processor 150. The digital signal processor 150 may receive the binning image signal IMG2 through the interface 120. The digital signal processor 150 may receive a mode setting command CMD from an outside through the interface 120. The outside may be, for example, the host 300. For example, the host 300 may be a computer, a mobile communication device or other image output terminal.

The mode setting command CMD may include an upscale mode setting command and a downscale mode setting command. The image signal processor 100 may output an up-scaled interpolation image signal IMG3 based on the binning image signal IMG2, in response to receiving the upscale mode setting command and the binning image signal IMG2. The image signal processor 100 may output a down-scaled interpolation image signal IMG3 based on the binning image signal IMG2, in response to receiving the downscale mode setting command and the binning image signal IMG2.

Figure 12:
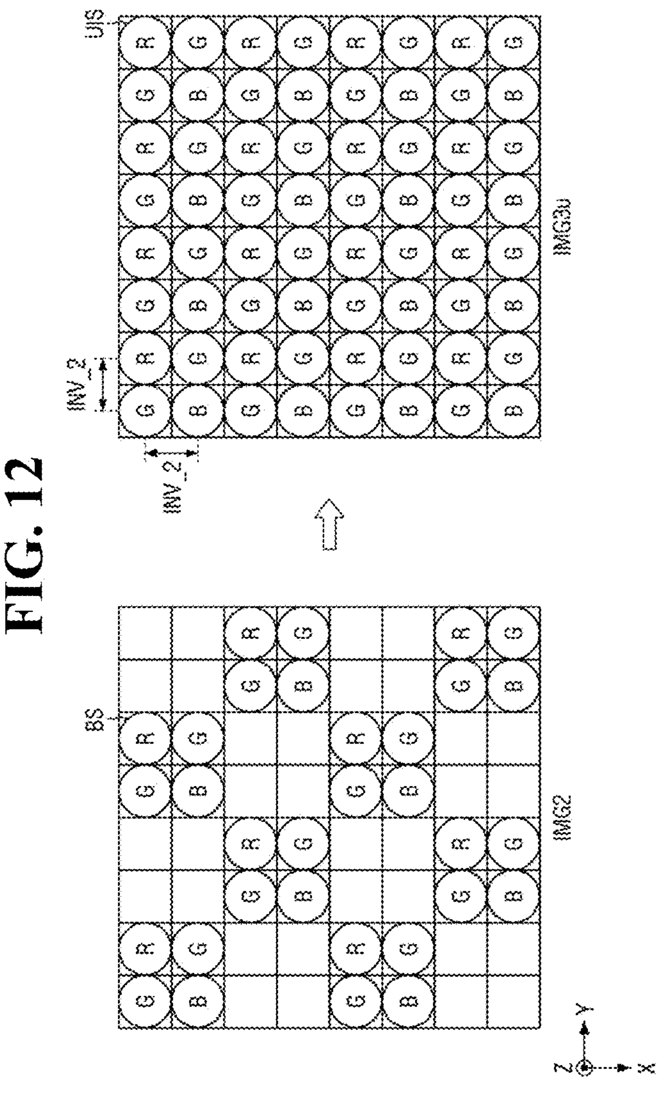
FIG. 12 is an example view illustrating an upscaling process of an image processing system according to some example embodiments.

FIG. 12 is an example view illustrating an upscaling process of an image processing system according to some embodiments.

According to some embodiments, since one binning signal BS is output based on two pixel signals, the binning image signal IMG2 including a plurality of binning signals BS may have a signal density that is half a signal density of the raw image signal IMG1 including a plurality of pixel signals. The image signal processor 100 may output an up-scaled interpolation image signal IMG3*u* based on the binning image signal IMG2, in response to receiving the upscale mode setting command and the binning image signal IMG2. The up-scaled interpolation image signal IMG3*u* may include a plurality of up-scaled interpolation signals UIS. Each up-scaled interpolation signal UIS may have a signal corresponding to one of green, red and blue colors. Each up-scaled interpolation signal UIS may be repeatedly represented in a form of the Bayer pattern. In this case, each of pixels associated with the respective up-scaled interpolation signals UIS may be arranged to be spaced apart from a pixel adjacent thereto in a row direction as much as a second interval INV_2. Also, each of pixels associated with the respective up-scaled interpolation signals UIS may be arranged to be spaced apart from a pixel adjacent thereto in a column direction as much as the second interval INV_2. In this case, the second interval INV_2 may refer to a distance from a center point of a pixel corresponding to one up-scaled interpolation signal UIS to a center point a pixel corresponding to an adjacent signal.

According to some embodiments, the second interval INV_2 may be equal to the first interval (INV_1 of FIG. 2) between the pixel signals. In other words, the up-scaled interpolation image signal IMG3*u* including a plurality of up-scaled interpolation signals UIS may have the same signal density as that of the raw image signal IMG1 including a plurality of pixel signals. That is, even in case of performing pixel binning, an image signal of a full-size, which has the same signal density as that of the raw image signal, may be generated through the image processing system 1.

Figure 13:
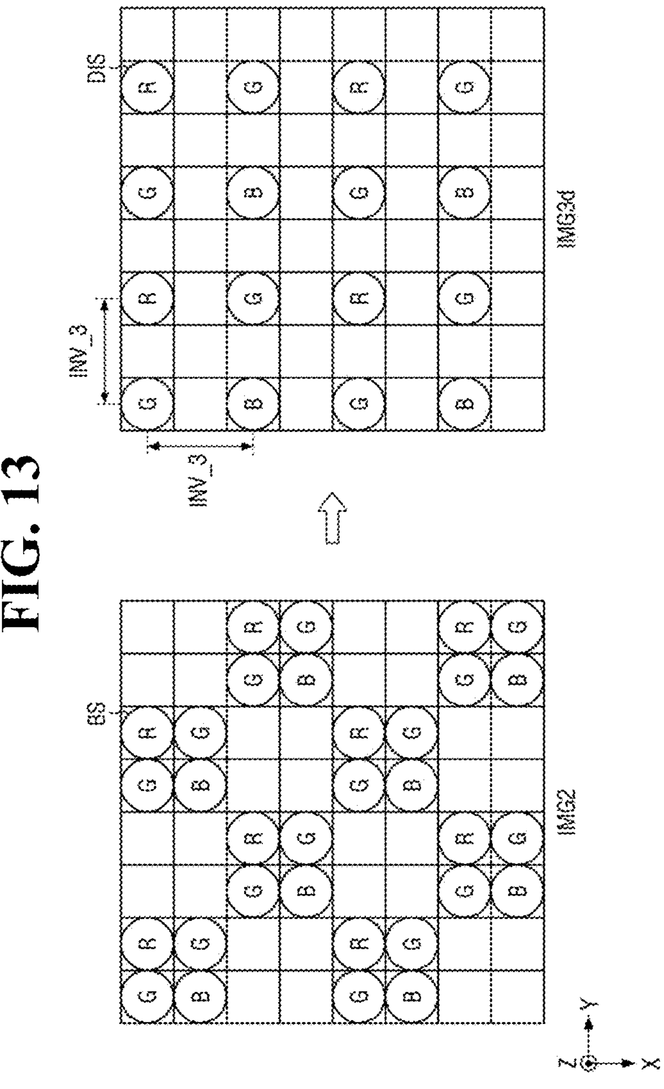
FIG. 13 is an example view illustrating a downscaling process of an image processing system according to some example embodiments.

FIG. 13 is an example view illustrating a downscaling process of an image processing system according to some embodiments.

According to some embodiments, since one binning signal BS is output based on two pixel signals, the binning image signal IMG2 including a plurality of binning signals BS may have a signal density that is half that of the raw image signal IMG1 including a plurality of pixel signals. The image signal processor 100 may output a down-scaled interpolation image signal IMG3*d* based on the binning image signal IMG2, in response to receiving the downscale mode setting command and the binning image signal IMG2. The down-scaled interpolation image signal IMG3*d* may include a plurality of down-scaled interpolation signals DIS. Each down-scaled interpolation signal DIS may have a signal corresponding to one of green, red and blue colors. Each down-scaled interpolation signal DIS may be repeatedly represented in the form of the Bayer pattern. In this case, each of pixels associated with the respective down-scaled interpolation signals DIS may be arranged to be spaced apart from a pixel adjacent thereto in a row direction as much as a third interval INV_3. Also, each of pixels associated with the respective down-scaled interpolation signals DIS may be arranged to be spaced apart from a pixel adjacent thereto in a column direction as much as the third interval INV_3. In this case, the third interval INV_3 may refer to a distance from a center point of a pixel corresponding to one down-scaled interpolation signal DIS to a center point of a pixel corresponding to an adjacent signal.

According to some embodiments, the third interval INV_3 may have a length that is twice the first interval (e.g., INV_1 of FIG. 2) between the pixel signals. In other words, the down-scaled interpolation image signal IMG3*d* including a plurality of down-scaled interpolation signals DIS may have a signal density of about 0.25 times, i.e., about a quarter, as compared to the raw image signal IMG1 including a plurality of pixel signals. Since each down-scaled interpolation signal DIS has the same interval (e.g., the third interval) as that of the signals adjacent thereto in the column and row directions, the interval between the signals may be uniform, thereby reducing an occurrence of a jagging artifact and/or a false color. Accordingly, the image signal with improved quality may be provided through the image processing system (e.g., 1 of FIG. 1).

Figure 14:
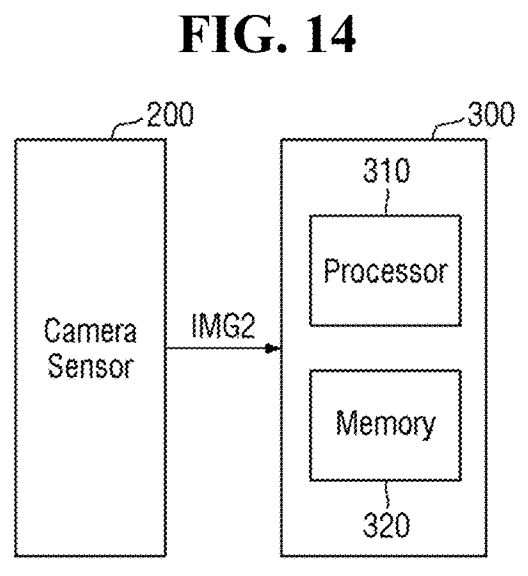

FIG. 14 is an example block diagram illustrating an image processing process of an image processing system according to some embodiments.

Referring to FIG. 14, the image sensor 200 may transmit the binning image signal IMG2 including a plurality of binning signals to the host 300. An instruction for causing the processor to output an up-scaled interpolation image signal or a down-scaled image signal by performing interpolation based on an image signal received in accordance with a selected mode may be stored in the memory 320 of the host 300. The processor 310 of the host 300 may output the up-scaled interpolation image signal based on the binning image signal IMG2, in response to an upscaling mode being selected and receiving the binning image signal IMG2. Also, the processor 310 may output the down-scaled interpolation image signal based on the binning image signal IMG2, in response to a downscaled mode being received and receiving the binning image signal IMG2.

Although example embodiments of the disclosure have been described with reference to the accompanying drawings, embodiments of the disclosure are not limited to the above embodiments, but may be implemented in various different forms. A person skilled in the art would understand that the disclosure may be practiced in other concrete forms without changing the technical spirit or essential characteristics of the disclosure. Therefore, it should be appreciated that the example embodiments as described above is not restrictive but illustrative in all respects.

What is claimed is:

1. An image processing system comprising:

an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and from a signal adjacent thereto in the second direction by the first interval; and a digital signal processor configured to perform image processing on an image signal received from the image sensor, wherein the pixel array further includes:

a first pixel disposed in a (k)th (k being a natural number) row and a (j)th (j being a natural number) column;

a second pixel disposed in a (k+2)th row and the (j)th column;

a third pixel disposed in the (k+2)th row and a (j+2)th column; and a fourth pixel disposed in a (k+4)th row and the (j+2)th column, wherein the first to the fourth pixels respectively output a first pixel signal, a second pixel signal, a third pixel signal, and a fourth pixel signal, wherein the image sensor is configured to output a first binning signal by performing binning based on the first pixel signal and the second pixel signal, output a second binning signal by performing binning based on the third pixel signal and the fourth pixel signal, and output a second image signal based on the first binning signal and the second binning signal, and wherein the digital signal processor is configured to output a third image signal including a plurality of interpolation signals by interpolating the second image signal in accordance with an operation mode, wherein each of the plurality of interpolation signals are spaced apart from an interpolation signal adjacent thereto in the first direction by a second interval and spaced apart from an interpolation signal adjacent thereto in the second direction by the second interval.

2. The image processing system of claim 1, wherein the first to the fourth pixels include a green color filter, wherein the pixel array includes:

a fifth pixel disposed in a (k+1)th row and a (j+1)th column, the fifth pixel including a green color filter, a sixth pixel disposed in a (k+3)th row and the (j+1)th column, the sixth pixel including a green color filter, a seventh pixel disposed in the (k+3)th row and a (j+3)th column, the seventh pixel including a green color filter, and, an eighth pixel disposed in a (k+5)th row and the (j+3)th column, the eighth pixel including a green color filter, wherein the fifth to the eighth pixels respectively output a fifth pixel signal, a sixth pixel signal, a seventh pixel signal and an eighth pixel signal, and wherein the image sensor is further configured to:

output a third binning signal by performing binning based on the fifth pixel signal and the sixth pixel signal;

output a fourth binning signal by performing binning based on the seventh pixel signal and the eighth pixel signal; and output the second image signal based on the first to the fourth binning signals.

3. The image processing system of claim 1, wherein the digital signal processor is configured to, in response to receiving an upscaling mode command, output the third image signal by interpolating the second image signal based on the upscaling mode command, and wherein the second interval is equal to the first interval.

4. The image processing system of claim 3, wherein the third image signal has a signal density that is twice a signal density of the second image signal.

5. The image processing system of claim 1, wherein the digital signal processor is configured to output, in response to receiving a downscaling mode command, output the third image signal by interpolating the second image signal based on the downscaling mode command, and wherein the second interval has a size that is twice a size of the first interval.

6. The image processing system of claim 5, wherein the third image signal has a signal density that is half a signal density of the second image signal.

7. An image processing system comprising:

an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and spaced apart from a signal adjacent thereto in the second direction by the first interval, wherein the pixel array includes:

a first pixel, a second pixel, a third pixel, and a fourth pixel arranged along the second direction;

a fifth pixel, a sixth pixel, a seventh pixel, and an eighth pixel, arranged in the first direction from the first to the fourth pixels and arranged along the second direction;

a ninth pixel, a tenth pixel, an eleventh pixel, and a twelfth pixel arranged in the first direction from the fifth to the eighth pixels and arranged along the second direction;

a thirteenth pixel, a fourteenth pixel, a fifteenth pixel, and a sixteenth pixel arranged in the first direction from the ninth to the twelfth pixels and arranged along the second direction;

a seventeenth pixel, an eighteenth pixel, a nineteenth pixel, and a twentieth pixel arranged in the first direction from the thirteenth to the sixteenth pixels and arranged along the second direction; and a twenty-first pixel, a twenty-second pixel, a twenty-third pixel, and a twenty-fourth pixel arranged in the first direction from the seventeenth pixel to the twentieth pixels and arranged along the second direction, wherein the image sensor further includes:

a first analog-to-digital converter connected to the first, the fifth, the ninth, the thirteenth, the seventeenth, and the twenty-first pixels;

a second analog-to-digital converter connected to the second, the sixth, the tenth, the fourteenth, the eighteenth, and the twenty-second pixels;

a third analog-to-digital converter connected to the third, the seventh, the eleventh, the fifteenth, the nineteenth, and the twenty-third pixels; and a fourth analog-to-digital converter connected to the fourth, the eighth, the twelfth, the sixteenth, the twentieth, and the twenty-fourth pixels, wherein the first to the twenty-fourth pixels respectively output a first pixel signal to a twenty-fourth pixel signal, wherein the first analog-to-digital converter is configured to output a first binning signal by performing binning based on the first pixel signal and a ninth pixel signal, and output a second binning signal by performing binning based on a fifth pixel signal and a thirteenth pixel signal, wherein the second analog-to-digital converter is configured to output a third binning signal by performing binning based on a second pixel signal and a tenth pixel signal, and output a fourth binning signal by performing binning based on a sixth pixel signal and a fourteenth pixel signal, wherein the third analog-to-digital converter is configured to output a fifth binning signal by performing binning based on an eleventh pixel signal and a nineteenth pixel signal, and output a sixth binning signal by performing binning based on a fifteenth pixel signal and a twenty-third pixel signal, and wherein the fourth analog-to-digital converter is configured to output a seventh binning signal by performing binning based on a twelfth pixel signal and a twentieth pixel signal, and output an eighth binning signal by performing binning based on a sixteenth pixel signal and a twenty-fourth pixel signal.

8. The image processing system of claim 7, wherein the first, the third, the sixth, the eighth, the ninth, the eleventh, the fourteenth, the sixteenth, the seventh, the nineteenth, the twenty-second, and the twenty-fourth pixels include a green color filter.

9. The image processing system of claim 8, wherein the second, the fourth, the tenth, the twelfth, the eighteenth, and the twentieth pixels include a red color filter, and wherein the fifth, the seventh, the thirteenth, the fifteenth, the twenty-first, and the twenty-third pixels include a blue color filter.

10. The image processing system of claim 7, further comprising a digital signal processor configured to perform image processing on an image signal received from the image sensor, wherein the digital signal processor is configured to output a third image signal including a plurality of interpolation signals by interpolating a second image signal, which is based on the first to eighth binning signals, in accordance with an operation mode, each of the plurality of interpolation signals being spaced apart from a signal adjacent thereto in the first direction by a second interval and spaced apart from a signal adjacent thereto in the second direction by the second interval.

11. The image processing system of claim 10, wherein the digital signal processor is configured to, in response to receiving an upscaling mode command, output the third image signal by interpolating the second image signal in accordance with the upscaling mode command, and wherein the second interval is equal to the first interval.

12. The image processing system of claim 11, wherein the third image signal has a signal density that is twice a signal density of the second image signal.

13. The image processing system of claim 10, wherein the digital signal processor is configured to, in response to receiving a downscaling mode command, output the third image signal by interpolating the second image signal in accordance with the downscaling mode command, and wherein the second interval has a size that is twice a size of the first interval.

14. The image processing system of claim 13, wherein the third image signal has a signal density that is half a signal density of the second image signal.

15. An image processing system comprising:

an image sensor including a pixel array, the pixel array including a plurality of pixels having a Bayer pattern, the image sensor being configured to output a first image signal including a plurality of pixel signals output from the plurality of pixels, wherein the plurality of pixels are repeatedly arranged in a first direction and a second direction crossing the first direction, and in the first image signal, each of the plurality of pixel signals is spaced apart from a signal adjacent thereto in the first direction by a first interval and spaced apart from a signal adjacent thereto in the second direction by the first interval; and a host configured to perform image processing on an image signal received from the image sensor, wherein the pixel array further includes:

a first pixel disposed in a (k)th (k being a natural number) row and a (j)th (j being a natural number) column;

a second pixel disposed in a (k+2)th row and the (j)th column;

a third pixel disposed in the (k+2)th row and a (j+2)th column; and a fourth pixel disposed in a (k+4)th row and the (j+2)th column, wherein the first to the fourth pixels respectively output a first pixel signal, a second pixel signal, a third pixel signal, and a fourth pixel signal, wherein the image sensor is configured to output a first binning signal by performing binning based on the first pixel signal and the second pixel signal, output a second binning signal by performing binning based on the third pixel signal and the fourth pixel signal, and output a second image signal based on the first binning signal and the second binning signal, wherein the host includes:

a memory configured to store at least one instruction; and a processor configured to perform the at least one instruction stored in the memory, wherein the at least one instruction, when executed, causes the processor to output a third image signal including a plurality of interpolation signals by interpolating the second image signal in accordance with a selected mode, each of the plurality of interpolation signals being spaced apart from a signal adjacent thereto in the first direction by a second interval and spaced apart from a signal adjacent thereto in the second direction by the second interval.

16. The image processing system of claim 15, wherein the first to the fourth pixels include a green color filter, wherein the pixel array includes:

a fifth pixel disposed in a (k+1)th row and a (j+1)th column, the fifth pixel including a green color filter;

a sixth pixel disposed in a (k+3)th row and the (j+1)th column, the sixth pixel including a green color filter;

a seventh pixel disposed in the (k+3)th row and a (j+3)th column, a seventh pixel including a green color filter, and, an eighth pixel disposed in a (k+5)th row and the (j+3)th column, the eighth pixel including a green color filter, wherein the fifth to the eighth pixels respectively output a fifth pixel signal, a sixth pixel signal, a seventh pixel signal, and an eighth pixel signal, and wherein the image sensor is configured to:

output a third binning signal by performing binning based on the fifth pixel signal and the sixth pixel signal;

output a fourth binning signal by performing binning based on the seventh pixel signal and the eighth pixel signal; and output the second image signal based on the first to the fourth binning signals.

17. The image processing system of claim 15, wherein the at least one instruction causes the processor to output the third image signal by selecting an upscaling mode and interpolating the second image signal in accordance with an upscaling mode command, and wherein the second interval is equal to the first interval.

18. The image processing system of claim 17, wherein the third image signal has a signal density that is twice a signal density of the second image signal.

19. The image processing system of claim 15, wherein the at least one instruction causes the processor to output the third image signal by selecting a downscaling mode and interpolating the second image signal based on a downscaling mode command, and wherein the second interval has a size that is twice a size of the first interval.

20. The image processing system of claim 19, wherein the third image signal has a signal density that is half a signal density of the second image signal.

* * * * *